United States Patent [19]
Chase et al.

[11] 3,973,397
[45] Aug. 10, 1976

[54] ROCKET MOTOR WITH ABLATIVE INSULATING CASING LINER

[75] Inventors: Michael John Chase, Kidderminster; Derek Anthony Smith, London, both of England; Michael Alan Dudley, Beaconsfield, Canada

[73] Assignee: Imperial Metal Industries (Kynoch) Limited, Birmingham, England

[22] Filed: Jan. 17, 1974

[21] Appl. No.: 434,305

Related U.S. Application Data

[60] Division of Ser. No. 280,162, Aug. 14, 1973, abandoned, which is a continuation-in-part of Ser. No. 730,950, May 21, 1968, abandoned.

[30] Foreign Application Priority Data
May 23, 1967 United Kingdom............23987/67

[52] U.S. Cl.............................. 60/253; 260/23.5 A; 102/103
[51] Int. Cl.²........................................... F02K 9/04
[58] Field of Search................. 60/200 A, 253, 255, 60/39.47; 260/41.5 A, 41.5 R, 23.5 A; 102/103

[56] References Cited
UNITED STATES PATENTS

| | | | |
|---|---|---|---|
| 3,054,258 | 9/1962 | Marti | 60/253 |
| 3,347,047 | 10/1967 | Hartz et al. | 60/253 |
| 3,408,320 | 10/1968 | Brucksch | 260/23.5 A |
| 3,464,355 | 9/1969 | Aclin et al. | 60/253 X |
| 3,485,791 | 12/1969 | Callan et al. | 260/42.14 |
| 3,636,881 | 1/1972 | Godfrey | 102/103 |
| 3,644,222 | 2/1972 | Fleming | 102/103 X |
| 3,686,868 | 9/1972 | Chase et al. | 60/200 A |
| 3,716,604 | 2/1973 | Dehm | 102/103 X |
| 3,802,346 | 4/1974 | Martin | 102/103 |

OTHER PUBLICATIONS

"Industrial and Engineering Chemistry," vol. 58, No. 8, Aug., 1966, pp. 39, 43.
Alekseenko et al., Chem. Abs., 58, p. 10373, (1963).
McCabe, R. F., "EPTR," Rubber Age, Dec., 1964, pp. 397–404.
Sayles, D. C., "Application of Elastomers in Solid Rocket Powerplants," Rubber World, Nov., 1965, pp. 89–96.

*Primary Examiner*—Carlton R. Croyle
*Assistant Examiner*—Robert E. Garrett
*Attorney, Agent, or Firm*—Cushman, Darby & Cushman

[57] ABSTRACT

A solid propellant rocket motor is provided with a liner between the motor case and the propellant, the liner comprising a terpolymer of ethylene, propylene and a nonconjugated diene and inert fillers. Ablative fillers such as heavy metal halides, calcium hydroxide and magnesium hydroxide may be included.

6 Claims, 1 Drawing Figure

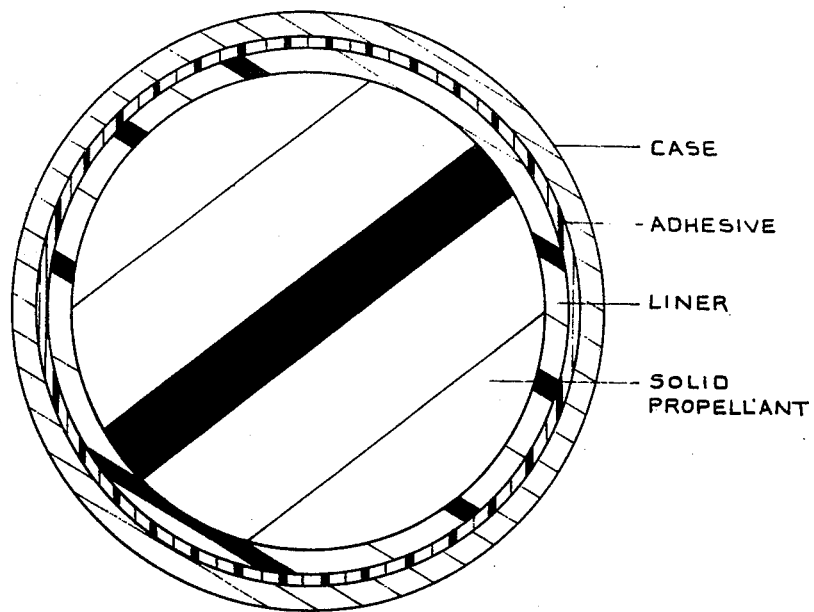

ROCKET MOTOR WITH ABLATIVE INSULATING CASING LINER

This is a division of application Ser. No. 280,162 filed Aug. 14, 1973, now abandoned, as a continuation-in-part of application Ser. No. 730,950 filed May 21, 1968, now abandoned.

This invention relates to rocket motors and in particular to liners for solid propellant rocket motors, especially case-bonded motors.

when a rocket motor is fired, high temperatures of 2000°F and above and extremely erosive conditions are developed in its combustion chamber for periods up to several minutes and the case of the motor rapidly fails unless it is protected from these conditions. For this reason, a rocket motor case is usually provided with a liner which insulates the case for a sufficient period of time to allow the propellant to burn completely without degrading the case. Liners are conventionally made of one or more elastomers compounded with fillers, the final composition being designed not only to provide thermal insulation but also to decompose slowly to enable it to absorb as much thermal energy as possible, whereby the temperature gradient across the remaining composition is reduced.

Chloro-sulphonated polyethylene elastomers are normally used as a liner constituent and are usually referred to as "Hypalon" elastomers. Such an elastomer is available under the trade mark "Hypalon 40" from E I du Pont de Nemours & Co. Because of the required thickness of the liner in a motor and the density of the elastomeric compositions containing "Hypalon" elastomers, these liners constitute a substantial portion of the non-propellant weight of a rocket motor.

With respect to fillers, it is known to include various inert filler materials, such as asbestos or silica, which provide some protection when substantially all of the elastomer content of the liner has decomposed. It is also known to include other fillers to produce a reduction in the rate of loss of liner material, for example boric acid which decomposes with a high endothermic heat of reaction at temperatures (180°–220°C) substantially below the initial temperature of decomposition of the elastomer content of the liner compound. In this way heat is absorbed to reduce the temperature of the liner and thereby reduce the rate of loss of elastomers.

In accordance with one important feature of the present invention, a rocket motor case is provided with a liner of reduced density and improved thermal degradation properties, the liner containing a major proportion of a cured elastomer which is a terpolymer of ethylene, propylene and a non-conjugated diene, and inert filler material. The non-conjugated diene may be dicyclopentadiene or cyclooctadiene. The liner can also contain up to 25% by weight of the elastomer content of a wide variety of other elastomers, such as chlorosulphonated polyethylene. By inert fillers are meant materials which do not change their composition or physical properties when heated in a rocket motor to several times the decomposition temperature of the elastomer, with the exception of those reactions which involve the loss of water. It is preferred that the inert fillers have a thermal conductivity not greater than that of silica.

According to another important feature of the invention, the endothermic properties of an elastomeric liner during firing are improved by incorporating in the liner an ablative filler compatible with the other liner components, which decomposes endothermically near to or above the temperature of the elastomer content of the liner to thereby reduce the rate of loss of the liner. Preferably, the filler is a compound having a greater endothermic heat of decomposition than the elastomer content or other ablation resistant properties. Heavy metal halides, especially lead chloride, are the preferred filler materials, particularly when the liner is made from the terpolymers referred to above. Also suitable are calcium hydroxide and magnesium hydroxide. By "compatible" is meant that the filler does not react to any substantial degree with the other components of the liner, or that any such reaction is not deleterious, and that the physical properties of the elastomer-containing compound are not degraded to an unacceptable degree.

The invention will be further understood from the following more detailed discussion taken with the drawing in which the sole figure is a schematic transverse cross-section of a solid propellant rocket motor.

There are, of course, many known elastomeric compounds and advances in chemistry continually produce new ones. Whether or not a particular elastomer will function satisfactorily as a rocket motor liner is not easily predictable, because a liner must possess a variety of physical and chemical properties, some of which tend to be mutually exclusive. A liner should have a low density in order not to add excessive non-propellant weight to the motor. The elastomer must be compatible with the filler materials which are usually employed, and functionally the liner must protect the motor case from high temperature and erosive conditions by having a suitable balance among thermal conductivity, the temperature at which endothermic decomposition occurs and the amount of heat absorbed during endothermic decomposition. A liner must also be compatible with the propellant itself. The task of fully testing a new elastomer is a major one in terms of time and expense.

As indicated above, an elastomeric liner protects its motor case in two main ways, first by the single insulating effect of a substantial thickness of the liner, and second by decomposing endothermically whereby less heat is transmitted through the liner. If the elastomer is to insulate by absorbing energy through decomposition, it will be slowly removed during the propellant firing and hence will reduce the thickness of the liner. Consequently the design has to compromise between heat insulation through the thickness of the liner and the heat absorption through decomposition of the liner. With these design criteria a liner composition must be developed on the basis that when incorporated with filler materials the elastomer will absorb thermal energy by decomposing endothermically but that it will not be decomposed too readily and that it will not be affected too severely by the erosive conditions to which it will be subjected. In addition, it is preferred that the decomposition residue shall remain in place on the liner in order to provide further thermal insulation and to help protect the non-decomposed liner material from the erosive and high heat transfer conditions.

Because an elastomer is known and is available commercially, this does not indicate its suitability for a rocket motor liner. Table 1 illustrates the widely diverse results that are obtained when commonly available elastomers are used as liners of the same thickness in rocket motors and are then tested by measuring the temperature of the motor case while firing the motor. In this table there are approximately equivalent quantities of filler materials, accelerators and other curing agents so that the major variation between the different liners is the elastomer. The elastomers which were used were styrene butadiene, neoprene, nitrile rubber and natural rubber, and the tests were by measuring the temperature on the outside of the motor casing at the same location of each test after 5, 10, 16 and 20 seconds from ignition. There is a large disparity in results despite the similarities between the liners of firings BBJ 292 and BBJ 294 and between BBJ 278 and BBJ 251.

Table 2 lists the procedural activation energy in K Cals per Mole for 13 elastomers, including Nordel 1070 as a typical example of an ethylene propylene terpolymer. The activation energy is the quantity of energy that is needed to commence thermal degradation of the elastomer and is a reliable indication of the likely success of the material in a liner. The Table shows that of the elastomers tested, the only one which has a greater activation energy than ethylene propylene terpolymer is fluorocarbon elastomer, a compound which is expensive and difficult to compound and fabricate. It should be noted that the ethylene propylene terpolymer has a considerably greater activation energy than chlorosulphonated polyethylene which is usually regarded as being a very successful liner compound.

Of particular relevance to performance as a rocket motor liner is the endothermicity of elastomer, i.e. the amount of thermal energy that it will absorb during decomposition. Table 3 lists 7 elastomers and their decomposition peak temperatures in °K and the endothermic energy absorption in joules per gram. It is seen from this Table that ethylene propylene terpolymer, exemplified by ECP 900 absorbs more energy endothermically than any of the other listed elastomers and is considerably superior in this respect to chlorosulphonated polyethylene. Regarding the fluoro elastomers, although they require more energy to commence decomposition, as can be seen from Table 2, they then absorb less thermal energy and are therefore less successful as a basis for compounding a rocket motor liner.

A further important component in a motor liner is the filler material, and again it is very difficult to predict results. Table 4 shows the effect on insulating properties of varying the silica content, an inert filler, in a liner based upon chlorosulphonated polyethylene. The silica content is given in parts per hundred of rubber (phr). The tests were carried out by making thermocouple temperature measurements on the outside of the motor cases at 10 and 15 seconds after ignition. The Table also gives the thickness in millimeters of liner which has decomposed. It is to be noted that test BBJ 387 shows a significant reduction in the temperature rise which occurs with a silica content of about 40 parts per hundred rubber.

With respect to ablative fillers, i.e. one which decomposes to absorb thermal energy, Table 5 shows the unpredictable effect of varying the lead chloride content in ECP 900 ethylene propylene terpolymer liners. It is to be noted that with a lead chloride content of 25 parts per hundred of rubber, there is a significant reduction in the thickness of the liner material attacked and in the temperature increase. This result is maintained through 75 parts of lead chloride, but at 100 parts of lead chloride the thickness of liner attached and the temperature rise at the exterior of the case are much greater.

In a typical example of the invention, a compound is produced for use as liner material for the case of a case-bonded solid propellant rocket motor by mixing together 97 parts by weight of the elastomer obtainable under the trade mark "Shell ECP 900," and 3 parts of "Hypalon 40." The "Shell ECP 900" is a terpolymer of ethylene, propylene and dicyclopentadiene available from the Shell Chemical Co Ltd and contains 60% ± 1% by weight of ethylene, 1.8% ± 1% by weight of dicyclopentadiene and the balance is propylene.

The elastomers are mixed together with 60 parts of "Manosil VN," which is a finely divided silica powder available from Hardman and Holden Limited, and 50 parts of lead chloride. The silica powder acts as a reinforcing filler, while the lead chloride is an ablative filler material which decomposes at a temperature above the decomposition temperature of the elastomeric contents.

Various plasticisers, curing agents and accelerators are added to the mix and in this example there are provided 8 parts of triethanolamine, 10 parts of pale liquid "Coumarone" resin (0.1% acidity) which is obtainable from Anchor Chemicals Limited, 5 parts zinc oxide, 2.5 parts sulphur, 3.75 parts dibenzthiazyl disulphide, 1.25 parts di-phenyl guanidine and 1.0 part stearic acid. During the mixing process, the triethanolamine and silica are mixed well into the elastomer and filler content before addition of the sulphur and accelerators.

After thorough mixing, the composition is applied to the cleaned interior of the metal case of a solid propellant rocket motor in the form of sheet, and is held in position by use of an adhesive such as "Redux 775" available from Bonded Structures Limited. As an alternative, the composition can be moulded and then bonded into the interior of the rocket motor case.

The composition is then cured under pressure typically for about 40 minutes at 160°C. The pressure can range between that applied by a vacuum bag, i.e. of the order of 10–14 p.s.i. to that obtainable by matched dies, i.e. of the order of 10,000 p.s.i. The temperature and time can also be varied, 15 minutes to 2 hours generally being used for 170°C-130°C. The resulting motor is illustrated schematically in the drawing.

The liner so produced in a rocket motor case is designed to have the same thickness as that of relatively conventional liner materials, such as that using "Hypalon 40," but has the advantage that the density of the liner is approximately three-fourths of the density of a comparable liner using "Hypalon 40." This will, of course, depend to some degree upon the filler materials which are used, but if the same fillers are used as those listed above, this result will usually be obtained.

In use it is found that this same thickness of liner material is perfectly satisfactory, the liner acting in as good a manner during motor firing as liners using "Hypalon 40" as the only elastomeric constituent. In fact, there may be some improvement in performance. Thus, when the rocket motor is fired, the liner adequately insulates the case of the motor from the temperature conditions of the motor interior, and lasts for as long a period of time as is necessary. While the liner wears away, it is absorbing thermal energy by its decomposition in order to enhance its physical insulating effect.

Because of the reduced density of the liner, it will be appreciated that there is a substantial reduction in the weight of the rocket motor prior to loading with a propellant, so that less work has to be done by the propellant in driving the rocket motor case, and consequently more effort is available for driving the load carried by the rocket motor.

Table 6 shows the insulating effectiveness of a liner of the preferred type and based on the ethylene propylene terpolymer "Royalene 301" in each of three identical rocket motors. The tests were carried out by locating 6 thermocouples numbered 23, 24, 25, 26, 27 and 28 at the same relative positions on the case of each motor, firing the motors, and recording the temperatures at 0, 20, 60, 120 and 180 seconds after firing. It has been established by earlier tests that for acceptable operation for this type of motor the external temperature should not exceed 300°C. at 180 seconds after firing.

In modification of the typical example, the elastomeric composition described above can be varied in various ways, in particular the terpolymer can be modified by the use of cyclooctadiene instead of the dicyclopentadiene. To make this modification, in place of the "Shell ECP 900," there is used the terpolymer available from E I du Pont de Nemours & Co, under the trade mark "Nordel 1078."

Alternatively, dicyclopentadiene can well be used as the nonconjugated diene but the elastomer is that available from the US Rubber Company under the trade mark "Royalene 301." In a still further alternative another elastomer from the US Rubber Company is used, viz "Royalene 501." In addition, the terpolymer can be varied from the 97 parts in the range 75-100, the "Hypalon" content varying in consequence between 25-0 parts. The more "Hypalon" content there is in the elastomer, the lower will be the density advantage attained by the use of the terpolymer.

The "Manosil VN3" content can vary between 40 and 100 parts, but as its content rises, the mix becomes more difficult to process. Alternatively or additionally other relatively inert fillers can be used, e.g. asbestos or silica fibre or asbestos powder. The lead chloride ablative filler content can vary from 20-60 parts and can be replaced wholly or partially by another high temperature filler, for example other heavy metal halides are suitable. Calcium hydroxide may be added or substituted for the lead chloride to increase the decomposition endotherm, its range will be 20-80 parts, preferably 40-50 parts. The calcium hydroxide may be replaced by other metal compounds with high decomposition endotherms, for example, magnesium hydroxide.

In further modifications the triethanolamine is replaced by "Carbowax" which is a polyethylene glycol available from Union Carbide Corporation, in which case only 1 part is normally used. Also the accelerator system of 3.75 parts of dibenzthiazyl disulphide, 1.25 parts di-phenyl guanidine and 1.0 part of stearic acid can be replaced by 1.0 part of mercapto-benzthiazole, 1.5 parts of tetramethyl thiuram disulphide and 1.25 parts of zinc diethyldithiocarbamate.

In another embodiment of the invention, an elastomer-containing compound is produced for use as liner material for the case of a case-bonded solid propellant rocket motor by mixing together 97 parts by weight of the elastomer obtainable under the trade mark "Shell ECP 900," and 3 parts of the elastomer "Hypalon 40." The "Shell ECP 900" is a terpolymer of ethylene, propylene and dicyclopentadiene and contains 60% ± 1% by weight of ethylene, 1.8% ± 1% by weight of dicyclopentadiene and the balance is propylene. The dicyclopentadiene is a diene containing unsaturated linkages of unequal reactivity. The "Hypalon 40" is a chlorosulphonated polyethylene.

The elastomers are mixed together with 60 parts of "Manosil VN3" which is a finely divided silica powder, and 45 parts of calcium hydroxide. The silica powder acts as a reinforcing filler material, and the calcium hydroxide is a chemical compound which decomposes endothermically at a temperature above the decomposition temperature of the elastomeric contents, i.e. above 400°C. The decomposition temperature of the calcium hydroxide is of the order of 450°-500°C. The calcium hydroxide is compatible with the other contents of the elastomer-containing compound.

Various plasticisers, curing agents and accelerators are added to the mix and in this embodiment there are provided 8 parts of triethanolamine, 10 parts of pale liquid "Coumarone" resin (0.1% acidity) which is obtainable from Anchor Chemicals Limited, 5 parts zinc oxide, 2.5 parts sulphur, 3.75 parts dibenzthiazyl disulphide, 1.25 parts di-phenyl guanidine, and 1.0 part stearic acid. During the mixing process, the triethanolamine and silica are mixed together and then well into the elastomer and calcium hydroxide before addition of the sulphur and the accelerator.

After thorough mixing, the elastomer-containing compound is applied to the cleaned interior of the case of a solid rocket motor in the form of sheet, and is held in position by use of an adhesive such as "Redux 775" available from Bonded Structures Limited. As an alternative, the composition can be moulded and then bonded into the interior of the rocket motor case.

The composition is then cured under pressure for about 40 minutes at 160°C. The pressure can range between that applied by a vacuum bag, i.e. of the order of 10-14 p.s.i., to that obtainable by matched dies, i.e. of the order of 10,000 p.s.i. The temperature and time can also be varied, 15 minutes to 2 hours generally being used for 170°C-130°C.

The liner so produced is found experimentally to insulate the case in a surprisingly efficient manner, the calcium hydroxide providing good heat absorption. Its endothermic heat of decomposition is about 280 calories/gram which is much greater than the endothermic heat of decomposition of the elastomer which is about 135 calories/gram.

In modifications of the typical embodiment, the calcium hydroxide content can vary from 20-80 parts, preferably 40-50 parts, and can be replaced at least partially by another chemical compound having an endothermic decomposition temperature above that of initial decomposition of the elastomer, and compatible with the other contents of the elastomer-containing compound. An example is magnesium hydroxide of which the endothermic heat of reaction is about 250 calories/grams.

In addition, the elastomeric composition described above can be varied in various ways; in particular the terpolymer can be modified by the use of other dienes containing unsaturated linkages of unequal reactivity, for example, methyl-tetra-hydro-indene instead of the dicyclopentadiene. To make this modification, in place of the "Shell ECP 900" there is used the terpolymer available from E I du Pont de Nemours & Co, under the trade mark "Nordel 1070".

Alternatively, dicyclopentadiene can well be used as the termonomer but the rubber is that available from the US Rubber Company under the trade mark "Royalene 301". In a still further alternative "Royalene 501" can be used. In addition, the terpolymer can be varied from the 97 parts in the range 75-100, the "Hypalon" content varying in consequence between 25-0 parts.

TABLE 1

| Ingredient | Parts by weight for firing number | | | |
|---|---|---|---|---|
| | BBJ 292 | BBJ 294 | BBJ 278 | BBJ 251 |
| SBR | 100 | 0 | 0 | 0 |
| Neoprene | 0 | 100 | 0 | 0 |
| Nitrile | 0 | 0 | 100 | 0 |
| Natural rubber | 0 | 0 | 0 | 100 |
| Magnesium carbonate | 32 | 32 | 0 | 0 |
| Clay | 0 | 0 | 35 | 20 |
| Antimony trioxide | 0 | 0 | 0 | 15 |
| Zinc oxide | 5 | 5 | 5 | 5 |
| Stearic acid | 1½ | ½ | 1 | 3 |
| Sulphur | 1¾ | 0 | 1½ | 2 |
| TMTS* | ¼ | 0 | 0 | 0 |
| MBTS° | 1½ | 0 | 1½ | 1½ |
| Magnesium oxide | 0 | 4 | 0 | 0 |
| Performance Temperature Rise (°C) on Outside of Motor | | | | |
| 5 seconds | — | 20 | — | 15 |
| 10 seconds | 20 | 90 | — | 80 |
| 16 seconds | — | 630 | — | — |
| 20 seconds | 200 | Fail | 50 | 290 |

*TMTS = tetramethyl thiuram disulphide
°MBTS = dibenzthiazyl disulphide

TABLE 2

| Elastomer | Procedural Activation Energy (K Cals per Mole) |
|---|---|
| Fluorocarbon | 100 |
| Ethylene propylene terpolymer | 81 |
| Polyetherurethane | 64 |
| Butyl | 62 |
| Chlorosulphonated polyethylene | 61 |
| Silicone | 60 |
| Ethylene propylene copolymer | 55 |
| Styrene butadiene | 55 |
| Neoprene | 46 |
| Nitrile | 37 |
| Polyisoprene | 33 |
| Natural | 30 |
| Polyurethane | 27 |

TABLE 3

| Polymer | Decomposition Peak Temperature °K | Endothermic Energy Absorption J g⁻¹ |
|---|---|---|
| Ethylene propylene terpolymer | 746 | + 543 |
| Butyl rubber | 678 | + 523 |
| Chlorosulphonated polyethylene | 742 | + 460 |
| Acrylic elastomer | 666 | + 410 |
| Fluoro elastomer | 778 | + 184 |
| Epichlorhydrin/ethylene oxide elastomer | 638 | + 54 |
| Epichlorhydrin elastomer | 625 | + 25 |

TABLE 4

| Firing Number | Material Number | Silica Content phr | Thickness attacked mm | Temperature rise on Thermocouple (°C) 10 secs. | 15 secs. |
|---|---|---|---|---|---|
| BBJ 383 | H.4 | 15 | 1.62–2.92 | 300 | 410 |
| BBJ 387 | H.3 | 40 | .87–2.35 | 50 | 60 |
| BBJ 379 | H.1 | 60 | .50–1.07 | 10 | 20 |
| BBJ 433 | H.25 | 80 | .50–1.35 | 10 | 20 |
| BBJ 425 | H.26 | 100 | .50–.92 | 10 | 20 |

TABLE 5

| Firing Number | Material Number | PbCl₂ Content phr | Thickness attacked (mm) | Temperature rise at end of burning (°C) |
|---|---|---|---|---|
| BBJ 506 | Y-10-3 | nil | 2.2–2.9 | 350 |
| BBJ 520 | Y-17-1 | 25 | 1.6–2.0 | 100 |
| BBJ 521 | Y-17-2 | 50 | 1.6–2.1 | 110 |
| BBJ 522 | Y-17-3 | 75 | 1.4–1.8 | 90 |
| BBJ 505 | Y-10-4 | 100 | 2.5–3.9 | 600 |

TABLE 6

| Rocket Motor | Time after ignition | Temperature in °C of Thermocouple No. | | | | | |
|---|---|---|---|---|---|---|---|
| | | 23 | 24 | 25 | 26 | 27 | 28 |
| BXL3 | 0 | 14 | 12 | 16 | 18 | 18 | 18 |
| | 20 | 18 | 13 | 16 | 16 | 18 | 16 |
| | 60 | 28 | 27 | 48 | 30 | 29 | 39 |
| | 120 | 52 | 45 | 111 | 80 | 72 | 92 |
| | 180 | 68 | 59 | 132 | 101 | 94 | 111 |
| BXL4 | 0 | 10 | 11 | 7 | 5 | 5 | 6 |
| | 20 | 58 | 47 | 6 | 6 | 5 | 7 |
| | 60 | 58 | 53 | 18 | 29 | 13 | 26 |
| | 120 | 87 | 69 | 62 | 85 | 53 | 75 |
| | 180 | 86 | 70 | 87 | 111 | 77 | 96 |
| BXL7 | 0 | — | 6 | 0 | 0 | 1 | 0 |
| | 20 | — | 24 | 0 | 0 | 1 | 0 |
| | 60 | — | 32 | 26 | 15 | 22 | 6 |
| | 120 | — | 42 | 83 | 55 | 81 | 49 |
| | 180 | — | 49 | 104 | 65 | 105 | 75 |

It must be commented that a failure on Thermocouple No. 23 prevented results from being obtained from it for the firing of rocket motor BXL7.

What is claimed is:

1. A rocket motor cas having an insulating liner bonded to the inner surface of the case, said liner comprising a cured elastomer containing 75–100 parts of a terpolymer of ethylene, propylene and a non-conjugated diene, up to 25 parts of at least one other elastomer, 40 to 100 parts of an inert filler material selected from the group consisting of silica and asbestos and 20–80 parts of ablative filler materials other than lead chloride which will decompose at temperatures near to or above the decomposition temperature of the elastomer content of the liner.

2. A rocket motor case as in claim 1 wherein the nonconjugated diene is dicyclopentadiene.

3. A rocket motor case as in claim 1 wherein the nonconjugated diene is cyclooctadiene.

4. A rocket motor case as in claim 1 wherein said liner includes chlorosulphonated polyethylene as said other elastomer.

5. A rocket motor case as in claim 1 wherein the ablative filler material is selected from the group consisting of heavy metal halides, magnesium hydroxide and calcium hydroxide.

6. A rocket motor case having an insulating liner bonded to the inner surface of the case, said liner comprising a cured elastomer containing 75–100 parts of a terpolymer of ethylene, propylene and a non-conjugated diene, up to 25 parts of at least one other elastomer, 40 to 100 parts of an inert filler material selected from the group consisting of silica and asbestos and 20–80 parts of ablative filler materials which have endothermic heats of decomposition greater than that of the elastomer content of the liner and which will decompose at temperatures near to or above the decomposition temperature of the elastomer content of the liner.

* * * * *